INVENTORS
ARAM K. HAMPIKIAN
O.D. BIDDY, JR.
BY Sughrue, Rothwell, Mion, Zinn & Macpeak
ATTORNEYS METALLIZED SEMICONDUCTOR DEVICE WITH FIRED-ON GLAZE CONSISTING OF 25-35% PbO, 10-15% $B_2O_3$, 5-10% $Al_2O_3$, AND THE BALANCE $SiO_2$ Filed Jan. 30, 1967 3 Sheets-Sheet 2

INVENTORS
ARAM K. HAMPIKIAN
O. D. BIDDY, JR.

BY Sughrue, Rothwell, Mion, Zinn & Macpeak
ATTORNEYS

INVENTORS
ARAM K. HAMPIKIAN
O.D. BIDDY, JR.
BY Sughrue, Rothwell, Mion, Zinn & Macpeak
ATTORNEYS United States Patent Office 3,460,003
Patented Aug. 5, 1969

3,460,003

METALLIZED SEMICONDUCTOR DEVICE WITH FIRED-ON GLAZE CONSISTING OF 25–35% PbO, 10–15% $B_2O_3$, 5–10% $Al_2O_3$, AND THE BALANCE $SiO_2$

Aram K. Hampikian, Norwalk, Conn., and Oscar D. Biddy, Jr., Raleigh, N.C., assignors to Corning Glass Works, Corning, N.Y., a corporation of New York Filed Jan. 30, 1967, Ser. No. 612,618
Int. Cl. H01l 3/00
U.S. Cl. 317—234 3 Claims

ABSTRACT OF THE DISCLOSURE

A semiconductor chip device doped with N- and P-type impurities and connected with appropriate conductors is encapsulated by a lead-broosilicate glass composition to protect from atmospheric contamination.

This invention relates to doped semiconductor devices for use in miniaturized electronics applications in chip form to permit "stacking" between semiconductor and circuit, and other compact forms of construction.

The prior art has employed vacuum or inert atmospheres to protect such semiconductor devices from atmospheric contamination. This kind of structure is bulky, however, because in effect it requires a "canning" of the semiconductor in a metal can or similar protective device. Other means, including encapsulating the metallized semiconductor with a plastic-like material have also been employed to protect the semiconductor surfaces from ambient atmosphere contamination. This latter approach however, has certain disadvantages again of bulkiness, producing an overly thick coating at least of the order of 25 microns.

The instant invention solves the difficulties associated with encapsulation of semiconductor "chips," by the use of a considerably thinner ambient atmosphere protective layer through the employment of a special glass glaze composition which has certain desirable properties when employed with semiconductor materials, producing a coating having a thickness of the order of 1–3 microns. Associated with this glaze is a high temperature metallized coating to connect said chip to an electric circuit.

It is, therefore, an object of this invention to produce a doped and metallized semiconductor article coated with a very thin layer of a glass composition.

It is a further object of this invention to metallize the doped semiconductor article to form contacts thereto with a high temperature metal film having good conductivity properties in association with such semiconductor article.

Other objects and advantages will become apparent from the accompanying more particular description of the preferred embodiments of the invention and as illustrated in the detailed drawings and the specific examples.

Figure 1:
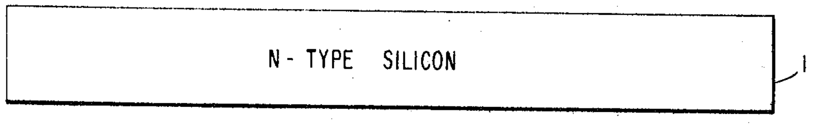
FIG. 1 shows a cross-sectional view of an N-doped silicon wafer.
Figure 2:
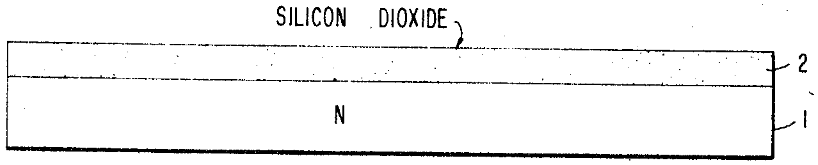
FIG. 2 shows a cross-sectional view of an N-doped silicon wafer with an oxide layer.
Figure 3:
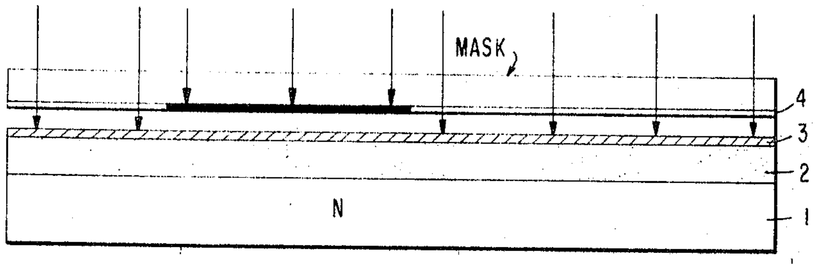
FIG. 3 shows a cross-sectional view of an N-doped silicon wafer coated with photoresist, masked and exposed to appropriate light.
Figure 4:
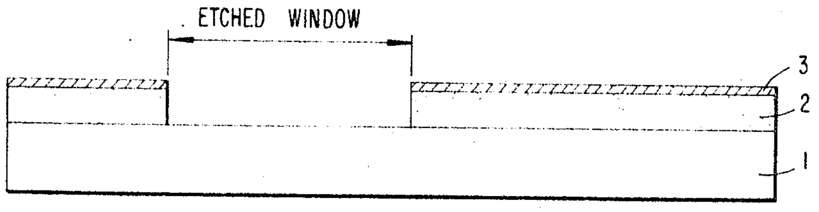
FIG. 4 shows a cross-sectional view of an N-doped silicon wafer with an etched window to the silicon surface ready for doping.

Broadly, the process involves employing predoped semiconductors, such as silicon, germanium, III–V compounds such as gallium arsenide or II–VI compounds such as zinc selenide and the like diffused with an appropriate impurity. This involves, for example, in the case of a crystal of silicon (see FIG. 1) an N-dopant such as phosphorus in the silicon crystal. Such a silicon dioxide layer (see FIG. 2) may be grown by exposing said N-doped silicon 1 at approximately 1000° C. to an oxygen source like pure oxygen or oxygen bubbled through water, admixed with nitrogen or any other inert gas. The silicon dioxide covered silicon wafer is now subjected to what is known as the "photoresist" process to etch holes in the oxide layer. The "photoresist" process comprises depositing an organic lacquer 3 shown in FIG. 3, commonly known in the trade by its proprietary name as KPR (Kodak Photo Resist), manufactured by the Eastman Kodak Company of Rochester, N.Y., or another similar lacquer. This organic lacquer is then exposed to a light source such as an ultraviolet light source through an appropriate mask 4, such as one produced photographically, i.e., a negative, to harden those areas of the "photoresist" which the mask permitted the light to expose. This hardening is a sort of polymerization of the organic lacquer. The KPR is then developed and the silicon dioxide covered with photoresist is etched down to the silicon with a saturated ammonium bifluoride solution, as shown in FIG. 4. Hot sulfuric acid may be used to remove the polymerized photoresist.

Figure 5:
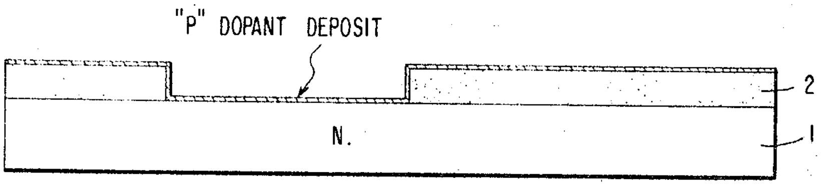
FIG. 5 shows a cross-sectional view of a silicon wafer with a P dopant deposit.
Figure 6:
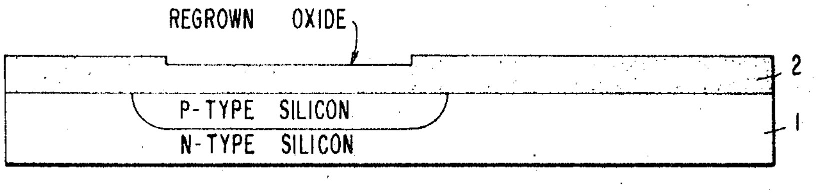
FIG. 6 shows a cross-sectional view of a doped silicon wafer covered with a regrown $SiO_2$ layer.
Figure 7:
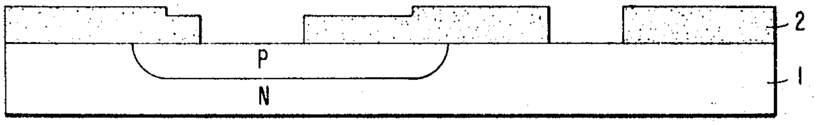
FIG. 7 shows a cross-sectional view of a previously N- and P-doped silicon wafer again opened up for a further N-type doping.
Figure 8:
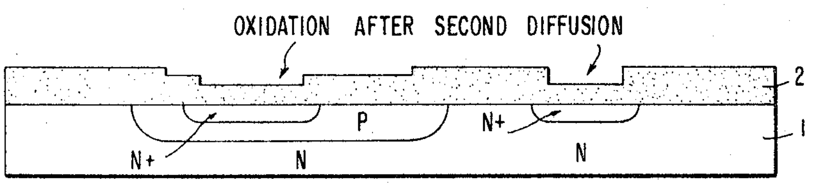
FIG. 8 shows a cross-sectional view of a fully doped silicon wafer with an oxide layer.

This exposed silicon surface previously N-doped throughout, is now placed at about 1000° C. into a diffusion furnace so as to introduce a P-dopant, boron for example, into the silicon body, shown in FIG. 5, to a depth of several microns. This doped surface is now reoxidized by the use of either pure oxygen or oxygen bubbled through water, etc., as in the first step of this process, FIG. 6, and then again submitted to the photoresist process. The photoresist is then removed after appropriate masking together with the silicon dioxide as before, to expose the silicon surface for doping as in FIG. 7. This time a dopant of opposite polarity or N is diffused into the crystal see FIG. 8 and then covered with an oxide layer again. This process is repeated and alternate N or P dopants are added until the desired number of layers of N or P-doped silicon are obtained. In this manner any combination of semiconductor devices including transistors, diodes, resistors and capacitors may be made.

Figure 9:
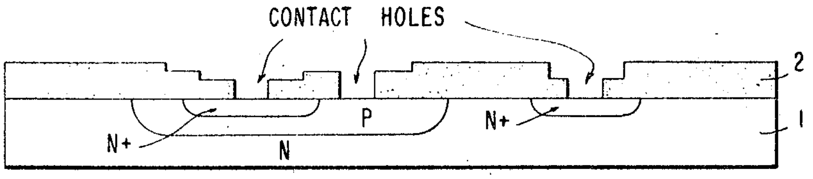
FIG. 9 shows a cross-sectional view of a fully doped silicon wafer with the oxide layer etched through to the various doped areas for contact.
Figure 10:
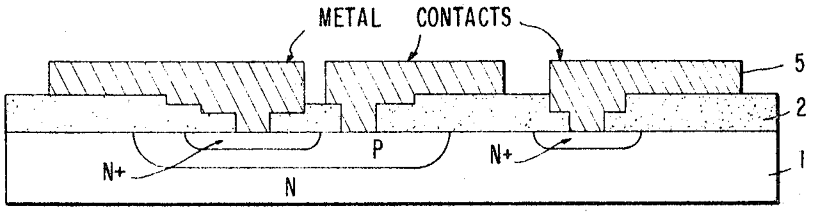
FIG. 10 shows the completed chip of the prior art with aluminum conductors connecting the various doped silicon areas to the appropriate electrical circuit in which it is to be employed.

Following the completion of the layers of N and P-type doping in the body of the semiconductor, the photoresist process is employed to etch contact holes to the various diffused areas of the wafer, as shown in FIG. 9 and connect by metal contacts to any appropriate circuit in which it is to be employed, see FIG. 10.

Ordinarily, metal contacts are formed in the conventional planar process, of aluminum, wherein a very thin layer of aluminum would be coated selectively over the exposed parts of the semiconductor doped N or P layers and then evacuated and sealed or covered with an organic resin or the like. In this invention, however, aluminum is undesirable because of its propensity to react with the oxygen present in the glass glaze and because it would penetrate into the silicon when heated to the approximately 800° C. temperature necessary for fusing the glass glaze composition of this invention.

Figure 11:
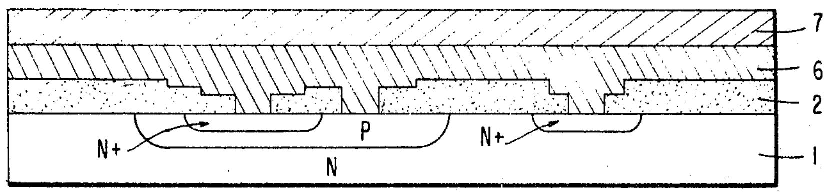
FIG. 11 shows a cross-sectional view of a fully doped silicon wafer coated with a double layer of differing high temperature conductors.

To solve this problem of undesirable compound forming and contamination of the substrate there is substituted for the aluminum a high temperature metal film such as silver, gold, platinum, copper, chromium, titanium, or alloys of titanium-silver, chromium-silver and silver-selenium. Compounds such as chromium silicides, nickel silicides, titanium silicides, tantalum silicides, titanium monoxide and the like, shown as 6 in FIG. 11, may be used as the second layer. The important factor however, is a top layer of a good conductive metal 7, such as silver, gold, platinum, or copper. Silver may not be used alone—it penetrates into the silicon, destroying the device.

This deposition is effectuated by depositing the metals, alloys or compounds by evaporation in a high vacuum, the thickness of said layer being of the order of ½ micro. Such deposition is performed at a reduced atmospheric pressure to lower the vaporizing temperature for a time sufficient to form the desired metal thickness.

Figure 12:
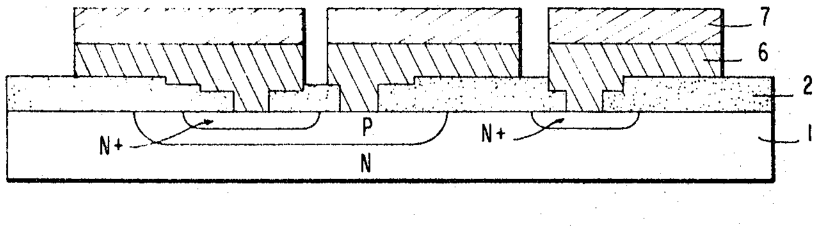
FIG. 12 shows a cross-sectional view of a fully doped silicon wafer after the conductors have been patterned by etching through a mask.

Following deposition, the metallized layer is etched appropriately by the photoresist process to leave only the pattern of conductors on the surface (see FIG. 12). The semiconductor, such as a doped silicon wafer is now ready for the coating by the lead-borosilicate glass which has a composition range of 25–35% lead oxide, 10–15% of boron trioxide, 5–10% of aluminum oxide with the balance, silica. This composition is intended to be fairly definite as it is the composition which has an expansion coefficient substantially identical to that of silicon, is nonreactive with the semiconductor device and has the property of being patternable.

Figure 13:
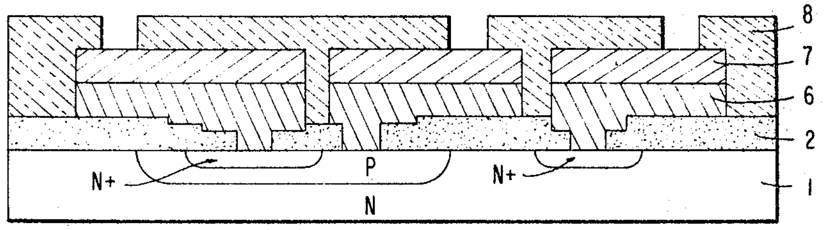
FIG. 13 shows a cross-sectional view of a fully doped silicon wafer encapsulated by a glass composition with holes etched in said glass to connect to the appropriate areas of the conductors.
Figure 14:
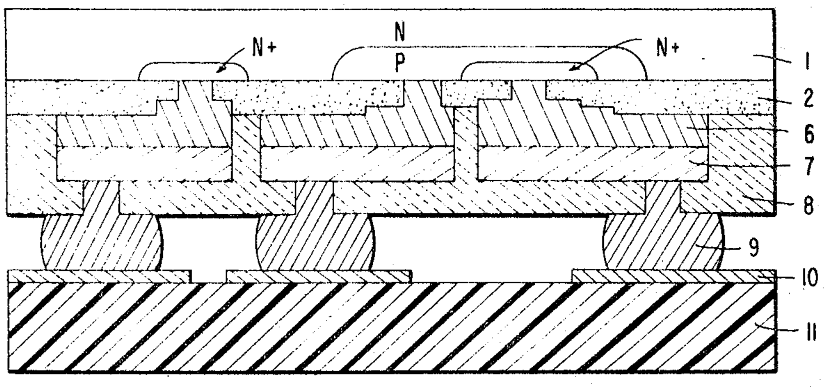
FIG. 14 shows the finished wafer connected into a circuit.

The process of coating the glass glaze 8 onto the metallized semiconductor wafer is performed by radio-frequency sputtering or precipitation from a liquid suspension. To eliminate porosity in the glass film 8 and to provide a perfect seal, the glass must be heated to about 800° C., for a few minutes. The chip thus formed is now ready for connection through its high temperature film connectors 6 and 7 shown in FIG. 13, in a surface to surface bond fashion to any electrical circuit 10 and 11 through contacts 9, see FIG. 14, in which it is to be employed.

As set out above, this glaze 8 is of the order of 1 to 3 microns, but may of course, be thicker. It is contemplated however, that the use of such chip semiconductor devices would be most advantageous where stacking of electrical components is desired and space is at a premium (see FIG. 14). The use of such devices finds a special application in today's miniaturization of components for such electrical apparatus as computers, broadcasting equipment, as well as receivers and generally employable wherever electrical circuits are needed.

In order to provide a better understanding of the details of this process in the following there are several examples given which are illustrative of the invention. These examples, however, are by no means limitative of the invention and are merely presented for help in describing the particular process involved.

The following example sets forth the prior art planar process and coating with aluminum followed by "canning" of the semiconductor.

EXAMPLE 1

A predoped single crystal silicon wafer with a highly polished top surface about 2.5 cm. in diameter and about 150 microns thick containing as an N-dopant a small amount of phosphorous is heated at about 1000° C., in oxygen and water vapor to convert the surface to a depth of about ½ micron to $SiO_2$. The oxidized wafer is coated with KPR (Kodak Photosensitive Resist), or the equivalent, and exposed to intense blue or ultraviolet light through a film or plate containing a photographic pattern which selectively absorbs or transmits light. This film or plate, called a "mask," is a negative of the photoresist image which becomes polymerized by light. A solvent removes the unpolymerized photoresist in the unexposed areas, and thereby develops the resist pattern. The silicon dioxide not covered by photoresist is etched down to the silicon in a saturated solution of ammonium bifluoride. Hot sulfuric acid removes the photoresist, leaving the pattern etched in the silicon dioxide.

A film of P-type dopant, such as boron, is deposited on the wafer, by the thermal decomposition of $B_2H_6$. The wafter is heated to about 1000° C. to diffuse the boron into the silicon not covered by silicon dioxide, and to change the diffused layer about 2 microns deep from N-type to P-type. Oxygen is added to reoxidize the bare silicon. The wafer is coated with photoresist and exposed through a second mask. The photoresist is developed. The silicon-dioxide not covered with photoresist is etched down to the silicon. The photoresist is removed. The wafer is coated and diffused about 1 micron deep with an N-dopant, phosphorous. Oxygen is added to form silicon dioxide over the bare silicon. The wafer is coated with photoresist and exposed through a third mask. The photoresist is developed. The oxide is etched away from the areas not covered by photoresist leaving contact holes down to the two diffused layers and to the silicon wafer. The photoresist is removed. The wafer is coated with aluminum, which is evaporated and deposited onto the wafer in a vacuum system. The metallized wafer is coated with photoresist and exposed through a fourth mask. The photoresist is developed. The aluminum not covered with photoresist is etched away by a 10% potassium hydroxide solution. The photoresist is removed by a commercial resist-stripper containing a powerful solvent.

The wafer is cut apart into separate transistors, each of which is mounted in an enclosure. Wire leads are attached, and the case is evacuated and refilled with an inert gas.

EXAMPLE 2

The single crystal of Example 1 after the last doping is vacuum evaporated with a combination of a bottom layer of chromium and a top layer of silver instead of aluminum. The evaporation is carried out at a temperature of about 2000° C., and under a vacuum of $10^{-5}$ mm. of Hg. The chromium is evaporated from an inverted boat containing chromium pellets. Silver wires hooked over a tungsten filament may be evaporated by connecting the filament to an electric power source in the same vacuum system.

These conducting metal layers are now coated with photoresist and exposed through a fourth mask. The photoresist is developed. The top metal layer is etched away where not covered with photoresist by the etching solution for silver of 1 gram chromium trioxide; 1 gram sulfuric acid; and 1 liter of water at a temperature of 65° C., while agitated. The time of treatment is 1 minute per micron thickness. The bottom layer of chromium is then etched to the silicon dioxide with an etching slurry for chromium consisting of 1 gram zinc dust wet with 10 ml. water and 100 ml. of 1% hydrochloric acid. The photoresist is then removed with an appropriate solvent. The wafer surface is now coated with a glass composition of 50% $SiO_2$, 7% $Al_2O_3$, 13% $B_2O_3$ and 30% PbO from 1 to 3 microns thick. It is applied by radia-frequency sputtering in a partial vacuum, in which accelerated gas molecules strike the glass source, which evaporates and deposits onto the wafer surface. Afterwards, the glass coating is heated at about 800° C., for a few minutes to improve its encapsulation properties. (Alternatively the glass could also be deposited by allowing the glass powder to settle onto the wafer from a liquid suspension.) This coating forms a continuous glass film when heated to about 800° C., for a few minutes. The glass film, or glaze, is coated with photoresist and exposed through a fifth mask. The photoresist is developed. The glass is etched way down to the conducting metal in a 70° C. solution of 1% ammonium bifluoride and 1% acetic acid. The photoresist is removed. The holes etched through the glaze allow access to the metal conductors. Small aluminum discs about 50 microns thick are punched from foil and ultrasonically welded to the wafer contacts through the holes etched to form small pillars on the wafer.

The wafer is cut apart, and the pillars on each chip are welded ultrasonically face-down to the conductors on a flat circuit board or substrate, making electrical contact to the circuit on the substrate.

EXAMPLE 3

The process of Example 2 as above, but instead of chromium titanium is employed as the bottom layer of the conductor. Amounts employed are about ½ micron of silver over $1/10$ micron of titanium. The etching solution employed for the titanium during the photoresist process is a 1% HF solution.

This invention has, for simplicity's sake, been described in terms of a limited number of materials and embodiments. The inventive concept, however, is to be much broader in that other semiconductor materials may be coated in this manner as well as other dopants may be used for effectuating simiar results. It is to be understood by those skilled in the art that various changes in form, details and in substances themselves may be made herein without departing from the spirit and scope of this invention.

What is claimed is:

1. A semiconductor device doped with N and P-type impurities in selected areas of said device, and connected with high temperature metal, alloy, compound or combinations thereof conductors capable of withstanding temperatures of about 800° C. thereto through etched holes and encapsulated with a lead borosilicate glass composition consisting essentially of from about 25 to about 35% lead oxide, from about 10 to about 15% boron trioxide, from about 5 to about 10% aluminum oxide, balance silicon dioxide.

2. A semiconductor device as in claim 1 wherein the first layer is a doped semiconductor material coated with an insulating oxide layer appropriately etched for connection, superimposed thereon a metal, alloy or compound for connection to an electrical circuit sealed with a layer of a lead-borosilicate glass composition.

3. A semiconductor device as in claim 1 wherein it is selected from silicon, germanium, gallium arsenide and zinc selenide.

References Cited

UNITED STATES PATENTS

| | | | |
|---|---|---|---|
| 3,261,075 | 7/1966 | Carman | 29—25.3 |
| 3,270,256 | 8/1966 | Mills | 317—234 |
| 3,303,399 | 2/1967 | Hoogendorn | 317—234 |

OTHER REFERENCES

Riseman et al.: IBM Technical Disclosure Bulletin, vol. 3, No. 12, May 1961.

Merrian et al.: IBM Technical Disclosure Bulletin, vol. 7, No. 11, April 1965.

JOHN W. HUCKERT, Primary Examiner

M. EDLOW, Assistant Examiner

U.S. Cl. X.R.

117—212; 317—235